Patented Jan. 14, 1941

2,228,261

UNITED STATES PATENT OFFICE 2,228,261

OXIDATION OF CYCLOHEXANE

Ellsworth Knowlton Ellingboe, Wilmington, Del., assignor to E. I. du Pont de Nemours & Company, Wilmington, Del., a corporation of Delaware No Drawing. Application February 23, 1940, Serial No. 320,511

3 Claims. (Cl. 260—533)

This invention relates to the preparation of adipic acid from cyclohexane by oxidation with nitric acid.

Adipic acid is of considerable importance as a component of plasticizers, resins, etc., and its commercial production is therefore of importance. One method for its production from benzene involves the preparation therefrom of chlorobenzene, the conversion thereof to phenol, hydrogenation of the latter to cyclohexanol and the oxidation of the latter, either directly to adipic acid or indirectly through cyclohexanone—a process involving a multiplicity of steps with consequent difficulties including losses at each stage of the multi-step process.

Another process which is very attractive due to the low cost of raw materials and to the relatively small number of chemical transformations required starts with the same initial material—benzene—and involves the hydrogenation of this to cyclohexane followed by oxidation, e. g., by nitric acid, of the latter to adipic acid. Previous endeavors, however, have resulted in but low yields of adipic acid, usually of about 18% (Markownikoff Ann. 302 1 (1898), Aschan, Ber. 32 1769 (1899)) but never more than about 24% (Nametkin, J. Russ. Phys. Chem. Soc. 40 1570 (1908), 42 581, 691 (1910); Ber. 42 1372 (1909)) and frequently much less, even as low as about 4% (Nametkin, loc. cit).

This invention has as an object an improvement in the nitric acid oxidation of cyclohexane to adipic acid. A further object is an improvement in yields obtained by this process. Another object is a decrease in the formation of by-product nitrocyclohexane and carbon dioxide. A still further object is a more efficient utilization of the oxidizing capacity of the nitric acid. Another object is the minimization of mechanical losses of initial materials. Other objects will appear hereinafter.

These objects are accomplished by the following invention wherein cyclohexane is oxidized to adipic acid and other products by heating the cyclohexane with from one to four mols, per mol of cyclohexane, of nitric acid of 90–100% strength at 90–120° C. and a pressure of 2–15 atmospheres for 2–30 hours.

The more detailed practice of the invention is illustrated by the following examples, wherein parts given are by weight. There are of course many forms of the invention other than these specific embodiments.

Example I

The preferred embodiment of this invention involves the oxidation of cyclohexane under the following conditions:

Pressure, 3 atmospheres
Temperature, 90–100° C. (during the main period of the reaction)
Mol ratio, nitric acid/cyclohexane, 2.54:1
Nitric acid strength, 95%
Time, 12 hours The following illustrates the results obtainable under these conditions. Fifty parts of cyclohexane, 97 parts (1.51 mols) of 98 per cent nitric acid and 3.8 parts of water are mixed in a reaction vessel fitted with a condenser. The apparatus is attached to an appropriate pressure regulating device and the internal pressure built up to a total of 3 atmospheres by means of nitrogen under pressure. While cold water is circulated through the reflux condenser, the reaction mixture is heated under constant supervision and control so that during the oxidation a steady but nonviolent effluence of nitrogen oxides takes place. For proper control of the reaction it is necessary to hold the internal temperature below 75° C. during the first hour of heating. The temperature is raised as conditions permit to 90–100° C. where it is maintained for a total reaction time of 12 hours. At the end of this time the nitric acid is practically spent and no more nitrogen oxides are being evolved. The internal pressure is kept constant at 3 atmospheres during the entire time. The reaction mixture comprises two layers which are separated while still warm. The oil layer is washed with water and bicarbonate solution and then fractionated in order to recover unreacted cyclohexane and to isolate nitrocyclohexane. The aqueous layer is cooled strongly and the adipic acid which crystallizes is filtered, washed and recrystallized from fresh water. Concentration of the mother liquors under vacuum and removal of the residual nitric acid gives a further quantity of crystalline product, which is separated into adipic acid plus a mixture of glutaric and succinic acids by another recrystallization from water. The yields of products are as follows: Recovered cyclohexane, 25.4 per cent; adipic acid, 34.1 per cent of the theoretical; nitrocyclohexane, 15.7 per cent of the theoretical; lower dibasic acids, 28.4 per cent by weight. The adipic acid obtained according to the above directions melts at about 148–150° C. and the residual mixture of lower dibasic acids melts in the range 90–130° C. Chemically pure adipic acid melts at 151–152° C.

*Example II*

The oxidation of cyclohexane may also be carried out using a "Duriron" reaction vessel with the reflux condenser and other apparatus fabricated of stainless steel. The removal of unchanged nitric acid from the residual acids is accomplished in a glass still. A supplementary scrubber with recirculating cold nitrobenzene is used for removing entrained cyclohexane from the exhaust gases, and the hydrocarbon thus absorbed is recovered by fractionation of the scrubbing fluid. The following table lists the results of representative oxidations, using 13 parts of cyclohexane and 26 parts of 95 per cent nitric acid in each run:

| Run | 1 | 2 | 3 | 4 |
|---|---|---|---|---|
| Pressure in atmospheres | 2.02 | 2.7 | 3.38 | 5.5–6.8 |
| Kettle temp. in °C | 60–97 | 57–96 | 68–96 | 105–120 |
| Length of run in hours | 27 | 27½ | 26½ | 4 |
| Cyclohexane recovered percent | 52.6 | 43.3 | 33.7 | 32 |
| Products in percent of theory yield based on $C_6H_{12}$ used: | | | | |
| (a) Refined adipic acid | 32.2 | 35.5 | 29.2 | 34 |
| (b) Residual acids (assumed to be a 50–50 mixture of glutaric and succinic acids) | 19.3 | 18.5 | 22.4 | 27 |
| (c) Nitrocyclohexane | 20.3 | 20.9 | 24.7 | 26 |

The most important factor in the attainment of the surprising efficiency of the present invention is the use of controlled superatmospheric pressures of 2 to 15 atmospheres in combination with a temperature range of 90–120° C. and a nitric acid concentration of 90 to 100%. The nitric acid is used in a mol ratio of 1 to 4 mols nitric acid per mol of cyclohexane. The time of oxidation varies from 2 to 30 hours, a shorter time being sufficient at higher operating temperature.

A principal advantage of this invention lies in the use of cyclohexane as the raw material. Starting with benzene as the ultimate raw material, this method of producing adipic acid requires only two intermediate steps—hydrogenation and oxidation—to achieve the goal. In contrast, the important processes employed heretofore involve a multiplicity of steps, as follows:

benzene→chlorobenzene→phenol→
$$\begin{array}{c}\nearrow \text{adipic acid}\\ \text{cyclohexanol}\\ \searrow \text{cyclohexanone→adipic acid.}\end{array}$$

The process of converting benzene to adipic acid by nitric acid oxidation of the intermediate cyclohexane, therefore, utilizes the shortest possible route as well as the most economical raw materials.

The conversion of cyclohexane to adipic acid has been realized before but no economical method for doing this has hitherto been available. The successful realization of an economic process for the preparation of adipic acid as disclosed herein removes the economic barriers to the nitric acid oxidation. A comparison with results obtained formerly is given in the following table wherein "weight per cent conversion" means the weight of the product as compared with the weight of the initial amount of the starting material named, expressed in percentage, "weight per cent yield" means the weight of the product as compared with the weight of the consumed starting material, expressed in percentage, A represents the results obtained according to the present invention as exemplified by the first example thereof, B and C the results obtained by Markownikoff supra, D those obtained by Aschan supra, E, F, G, and H those obtained by Nametkin supra.

| | A | B | C | D | E | F | G | H |
|---|---|---|---|---|---|---|---|---|
| *Adipic acid* | | | | | | | | |
| 1. Weight percent conversion based on $C_6H_{12}$ | 44.2 | 22.2 | 16.6 | 17.5 | 4.3 | | 8.6 | 22.4 |
| 2. Weight percent yield based on $C_6H_{12}$ | 59.3 | 32.4 | 20.2 | 17.5 | | | 29.8 | 41.2 |
| 3. Weight percent conversion based on $HNO_3$ | 32.2 | 7.3 | 1.45 | 2.5 | 3.66 | | 11.4 | 7.45 |
| *Nitrocyclohexane* | | | | | | | | |
| 1. Weight percent conversion based on $C_6H_{12}$ | 18.0 | 23.2 | | | | | 19.2 | 24.4 |
| 2. Weight and yield based on $C_6H_{12}$ | 24.1 | 33.8 | | | | | 25.6 | 66.6 | 44.7 |
| *By-product acids* | | | | | | | | |
| 1. Weight percent conversion based on $C_6H_{12}$ | 21.2 | 15.1 | | | | | 7.7 | 15.8 |
| 2. Weight percent yield based on $C_6H_{12}$ | 28.4 | 22 | | | | | 26.6 | 29 |

This invention is of importance to the chemical industries which produce adipic and other dicarboxylic acids, since these acids are principal ingredients in the formulation of many solvents, plasticizers, resins, plastics and miscellaneous organic chemical specialties.

The above description and examples are intended to be illustrative only. Any modification of or variation therefrom which conforms to the spirit of the invention is intended to be included within the scope of the claims.

What is claimed is:

1. Process which comprises oxidizing cyclohexane by heating the same with 90–100% nitric acid at 90–120° C. and a substantially constant pressure within the range of 2–15 atmospheres for 2–30 hours in a molal ratio of from one to four mols nitric acid per mol of cyclohexane.

2. Process according to claim 1 wherein the reactants are heated together at about 75° C. for one hour prior to heating in the range 90–120° C.

3. Process which comprises oxidizing cyclohexane by heating 50 parts of the same with 97 parts of 98% nitric acid and 3.8 parts of water under a pressure of three atmospheres at about 75° C. for one hour and then at 90–100° C. for twelve hours, separating the oil layer from the aqueous layer and cooling the aqueous layer to obtain crystalline adipic acid.

ELLSWORTH KNOWLTON ELLINGBOE.